UNITED STATES PATENT OFFICE.

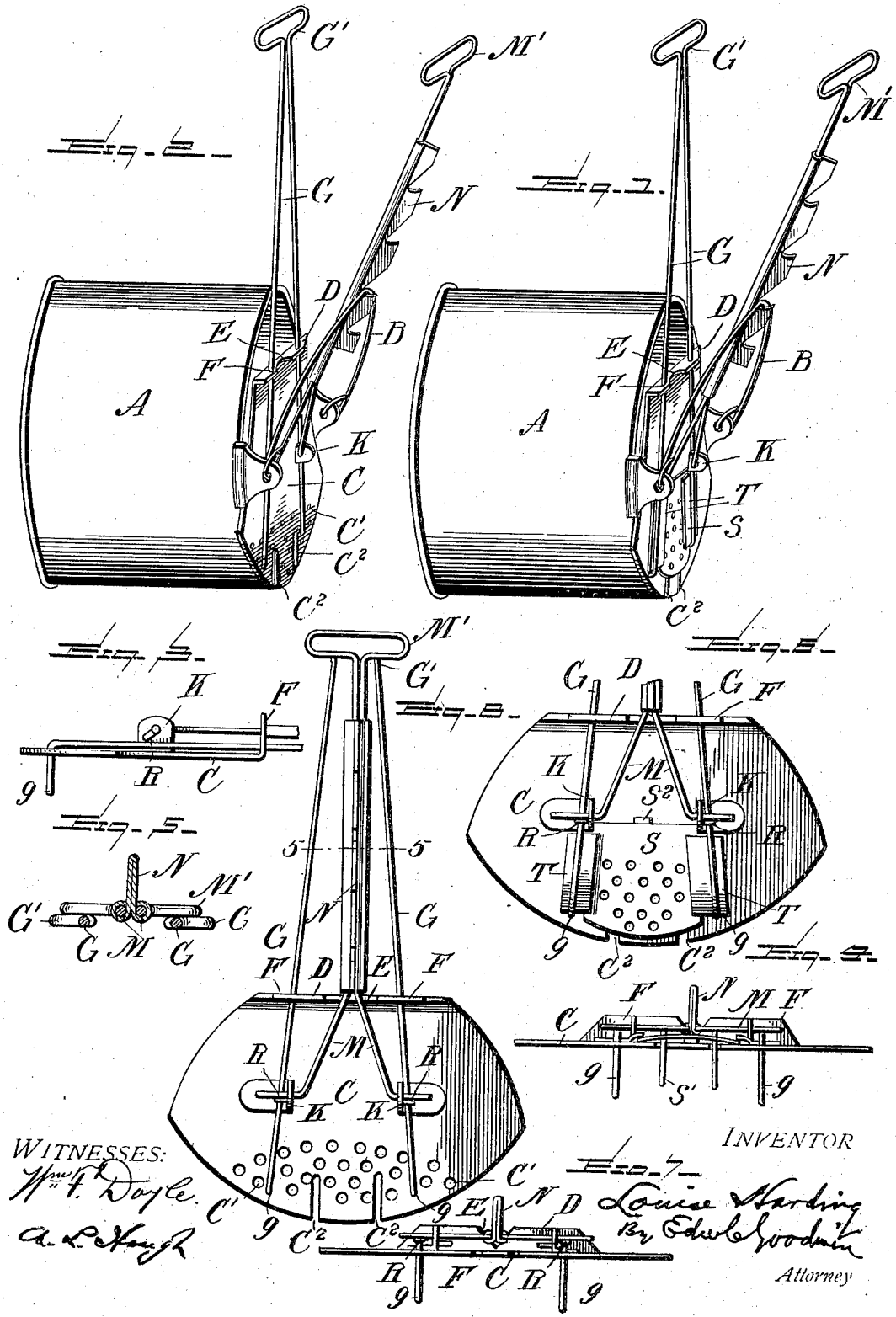

LOUISE HARDING, OF NEW YORK, N. Y.

CULINARY UTENSIL.

SPECIFICATION forming part of Letters Patent No. 687,747, dated December 3, 1901.

Application filed March 29, 1901. Serial No. 53,395. (No model.)

*To all whom it may concern:*

Be it known that I, LOUISE HARDING, a citizen of the United States, residing at New York, in the county of New York, State of New York, have invented certain new and useful Improvements in Culinary Utensils; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in a culinary utensil, and especially to a kettle and bail holder, whereby a kettle containing heated substances may be readily handled and tilted to allow hot water to drain out without danger of the operator being burned from the escaping steam, suitable means being provided for straining the liquid as it is poured out of the kettle, and of an extension-plate which is perforated and held by cleats adapted to fit over the edge of the kettle.

My invention is clearly illustrated in the accompanying drawings, which, with the letters of reference marked thereon, form a part of this application, and in which drawings—

Figure 1 is a perspective view of my device shown as applied to a kettle. Fig. 2 is a similar view of the device with extension-plate removed. Fig. 3 is a detail view showing the two handles held together. Fig. 4 is a front elevation. Fig. 5 is a cross-sectional view taken on line 5 5, Fig. 8. Fig. 6 is a top plan view of the two plates. Fig. 7 is an edge view of the holder with extension-plate removed. Fig. 8 is a top view of holder with extension-plate removed.

Reference now being had to the details of the drawings by letter, A represents a kettle with circular outlined marginal edge and provided with a bail B.

C designates a plate having strainer-perforations C' therein, which are disposed near the outer circular outlined edge of said plate. The inner edge of said plate is bent at right angles, as at D, and is notched, as at E, and provided with two apertures F F, the lower marginal edges of which are in a plane with the upper surface of said plate.

G designates a wire which is bent upon itself to form a handle G', the shank portion of said handle being passed through the apertures F F, resting on the upper surface of said plate, and have their angled ends *g* passed through apertures in the plate at slight distances in from the curved marginal edge of the plate. These angled ends are designed when the device is applied to a kettle or other receptacle to form lugs, which engage the inner wall of the kettle or receptacle near its upper edge, while the curved edge of the plate is designed to extend over the edge of the kettle or receptacle. At the points where said angled ends of the handle pass through the aperture in said plate I prefer to securely hold the ends in the aperture by soldering or other suitable fastening means. On the upper surface of the plate are fastened the apertured ears K, in which the angled ends of the wire M are journaled, thus forming a bail. Said wire M is bent upon itself, forming a loop M', which when the two handles are swung together register with each other. The straight shank portions of the wire M from the loop to the plate are held in contact with each other by means of a notched strip of metal N, made of tin or other suitable material, which is bent upon itself longitudinally, and the edges of said strip are tubulated and embrace said shank portions of the wire M, as shown, the notched portion of said strip being at right angles to the flat surface of the plate. This notched strip N is provided to receive and hold the handle B of the bucket or receptacle A. The end of the strip N when the two handles are held together is adjacent to the notched right-angled edge of the plate, and the wire M at this point rests in said notch, and the shank portions of said wire are outwardly bent to locations adjacent to said ears.

The angled ends of the wire M each have secured thereto a cam R, which when the handle formed out of the wire M is raised so as to engage the bail of the kettle engage the upper edges of the wire G, and as the handle or loop M' pushes the bail forward or away from the operator, who holds the two bails of the holder, one in each hand, the screen-plate will be pushed down against the top of the kettle, and the latter and tilting device may be easily operated together.

The expansion-plate S is provided with pins S', which extend through slots $C^2$ in the plate C. This perforated plate S is held by frictional contact to the plate C by means of cleats T. This plate S, which has perforations registering with perforations in the plate C, may be pushed forward as an extension to fit a smaller bucket or kettle, and when the extension-plate is not in use it may be pushed back over the plate, said slots $C^2$ in the plate C being provided to receive the pins S'. In order to operate the slide-plate S, the handle $S^2$ is provided, whereby said plate may be pushed down so that the pins S' will contact with the inner face of the receptacle.

Having thus described my invention, what I claim to be new, and desire to secure by Letters Patent, is—

A kettle holding and tilting utensil, consisting of the plate C, having slots $C^2$ therein, the stationary handle secured to the upper face thereof, the pivoted handle with bail-engaging notches thereon, cleats T secured to said plate and passing underneath the shank portions of said stationary handle, a sliding perforated extension-plate S with handle thereon, said plate adapted to be held frictionally at different locations by said cleats, pins S' projecting from the bottom of said extension-plate, and adapted to enter slots $C^2$ in the edge of the plate when the extension-plate is pushed back, as set forth.

In testimony whereof I affix my signature in the presence of two witnesses.

LOUISE HARDING.

Witnesses:
J. B. SLATTERY,
GEO. W. KENDELL.